F. GILL.
AEROPLANE.
APPLICATION FILED DEC 13, 1921.
1,429,730.
Patented Sept. 19, 1922.
6 SHEETS—SHEET 2.
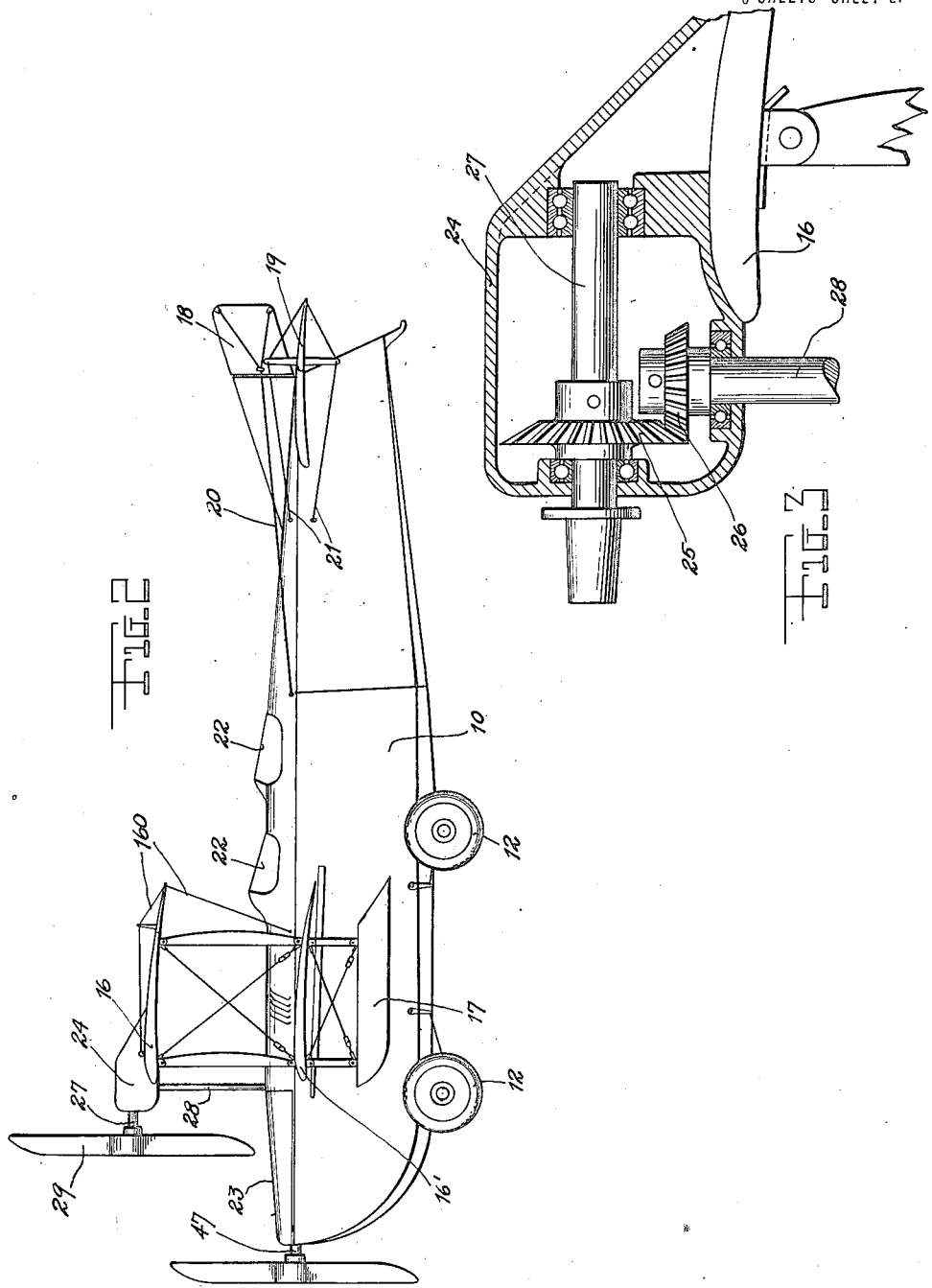
INVENTOR
Frank Gill
BY *M. Deine*
ATTORNEY

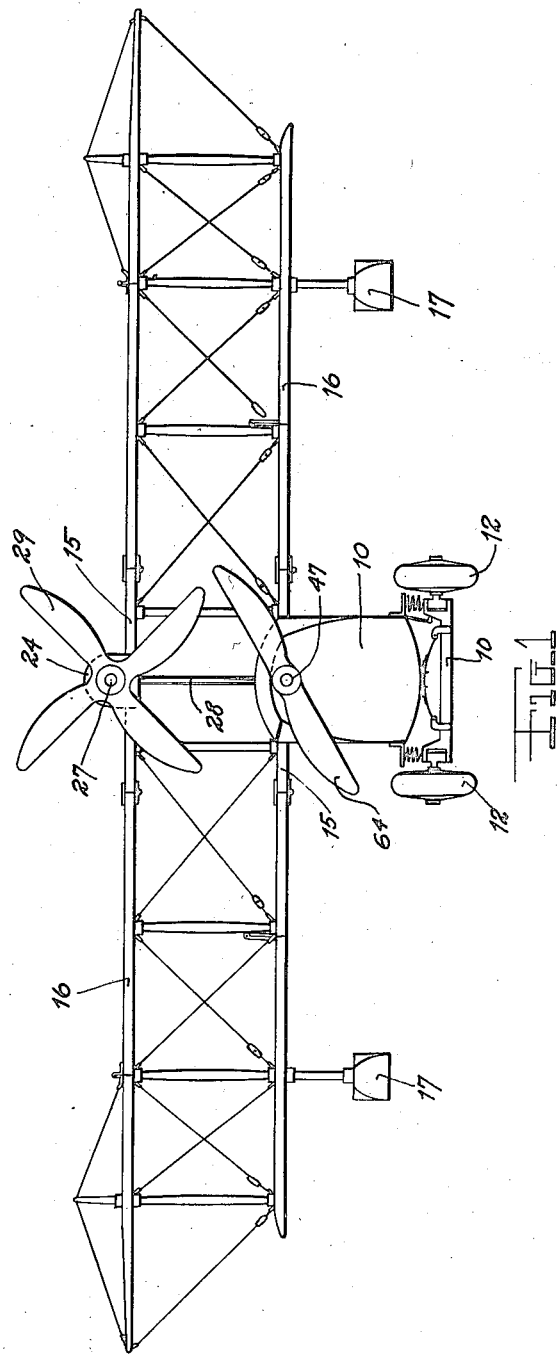

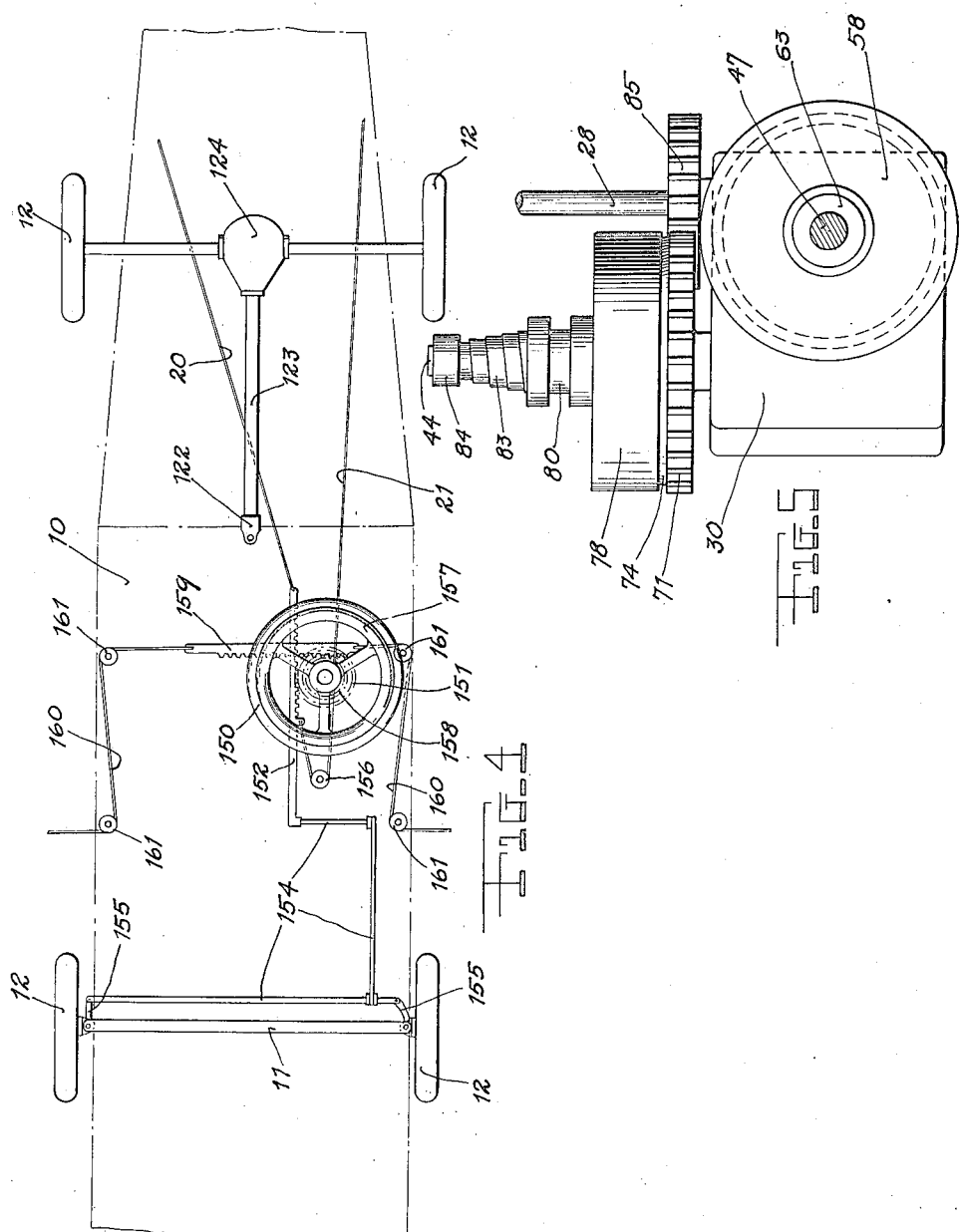

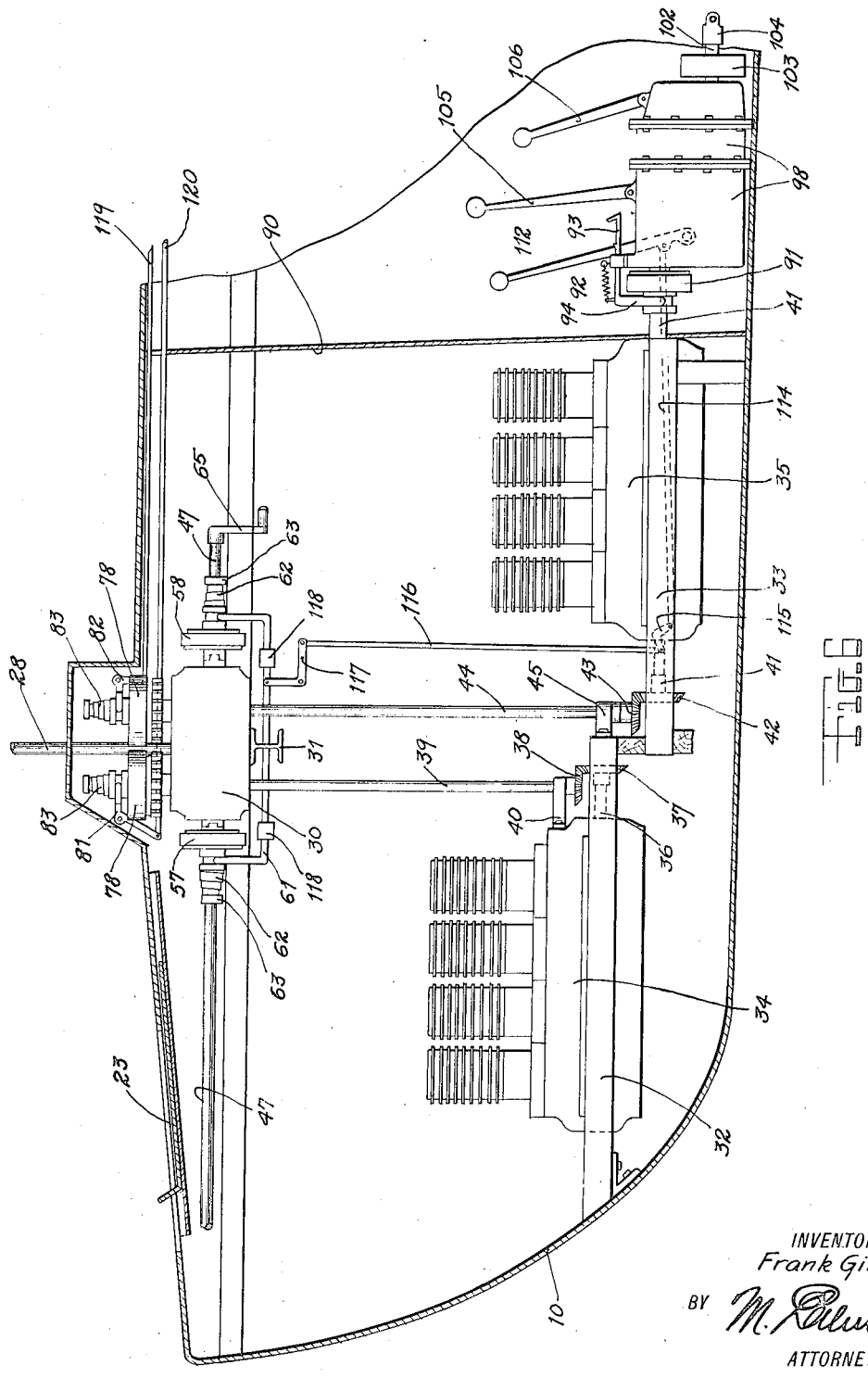

F. GILL.
AEROPLANE.
APPLICATION FILED DEC 13, 1921.
1,429,730. Patented Sept. 19, 1922.
6 SHEETS—SHEET 5.
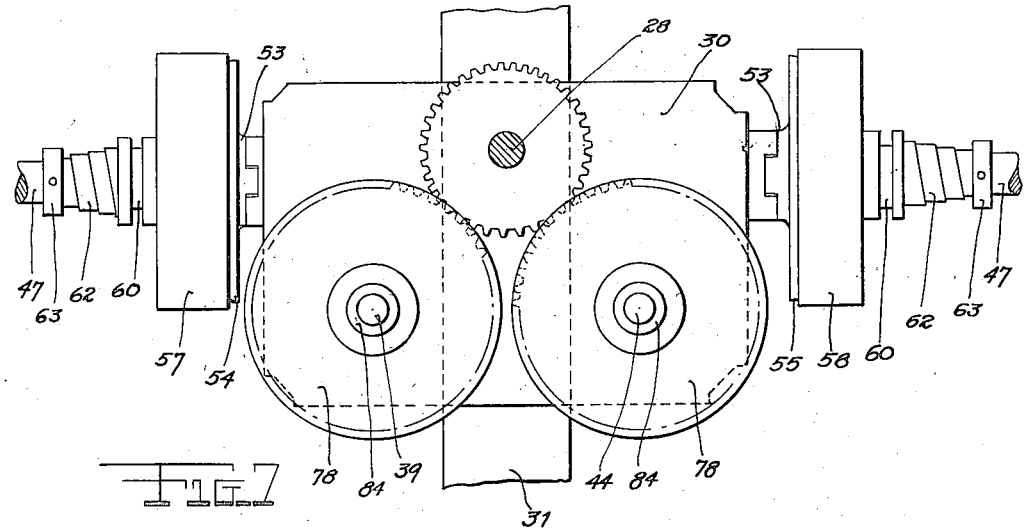
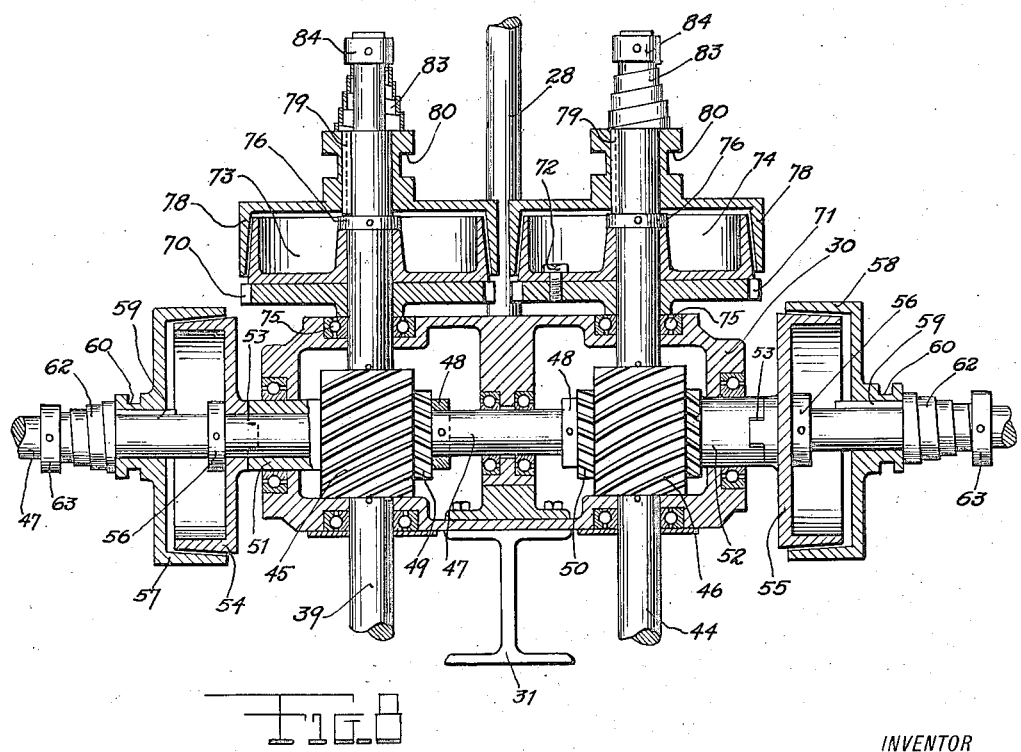
INVENTOR
Frank Gill
BY
ATTORNEY F. GILL.
AEROPLANE.
APPLICATION FILED DEC 13, 1921.
1,429,730.
Patented Sept. 19, 1922.
6 SHEETS—SHEET 6.
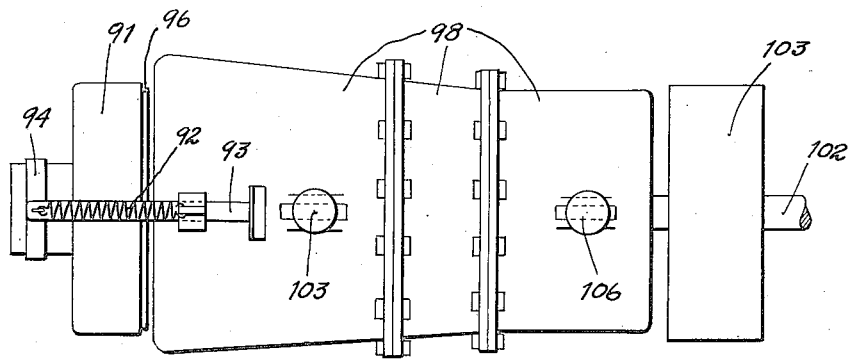
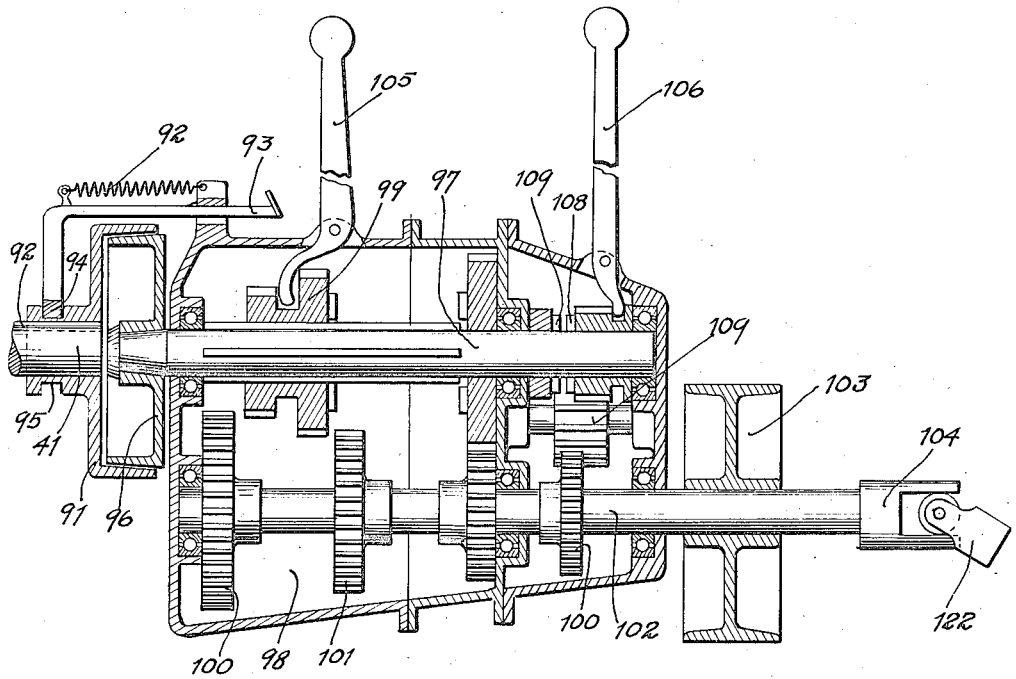
INVENTOR
Frank Gill
ATTORNEY Patented Sept. 19, 1922.

1,429,730

UNITED STATES PATENT OFFICE.

FRANK GILL, OF CHICAGO, ILLINOIS.

AEROPLANE.

Application filed December 13, 1921. Serial No. 521,990.

*To all whom it may concern:*

Be it known that I, FRANK GILL, citizen of Poland, residing at Chicago, in the county of Cook and State of Illinois, have invented certain new and useful Improvements in Aeroplanes, of which the following is a specification.

One of the objects of this invention is to provide an aeroplane with means by which the structure may be readily and safely propelled over land surfaces in case of accident to the wing members or for use in attaining flight or effecting landings distant from the hanger.

Another object provides for a mobile structure adapted to be driven by the same motive power employed for flight purposes.

A third object relates to a duplex engine installation, a passenger body secured to a chassis and means for dual control conveniently arranged.

These and other objects are attained by the novel construction and arrangement of parts hereinafter described and shown in the accompanying drawings, forming a material part of this disclosure, and in which:—

Figure 1 is a front elevational view of a flying machine.

Figure 2 is a side elevational view of the same.

Figure 3 is a longitudinal section showing the drive and housing for the super-structure propeller.

Figure 4 is a plan view showing the position of steering means with respect to fuselage floor outline.

Figure 5 is an enlarged side elevational view of the propeller clutch and driving means.

Figure 6 is an enlarged longitudinal partial sectional view of the interior of the car showing an arrangement of the power units, change-gear box and primary propeller driving and control means.

Figure 7 is an enlarged top plan view of the propeller clutch and driving means.

Figure 8 is an enlarged longitudinal vertical sectional view of the same.

Figure 9 is an enlarged top plan view of the change gear box.

Figure 10 is an enlarged longitudinal vertical sectional view showing the interior of same.

Referring to the drawing in detail, the numeral 10 designates in general, the fuselage or body of an aeroplane adapted to be mounted on a chassis frame provided with axle elements 11 adapted to maintain rotatable wheels 12.

A super-structure 15, rigidly secured to the fuselage, hingedly supports the sustaining planes 16 and 16'.

A pair of pontoons 17 are disposed one at each end of the planes. Rudders or steering vanes 18 and 19 are provided at the rear end of the fuselage and are controlled by cables 20 and 21 running from the cock-pit.

Observation openings over the cock-pit are closed by celluloid covers 22 and entrance to the engine compartment is effected through an opening 23 at the forward end of the fuselage.

Secured to the upper central portion of the super-structure is a casing 24 containing bevel gears 25 and 26 fixed to the shafts 27 and 28 respectively. The shaft 27 extends through the casing and is adapted to secure a propeller 29 thereon. The gear 26 is fixed to the vertical shaft 28 and extends downward into a thrust bearing secured in a gear box 30 fixed at the upper portion of the engine compartment to cross beams as at 31.

On frames 32 and 33, rigidly fixed to the fuselage interior, are a pair of V type, eight cylinder aeroplane engines 34 and 35 respectively.

From the forward engine 34, a drive shaft 36 extends towards the rear and is provided with a bevel gear 37 engaging a mating bevel gear 38 fixed to vertically disposed shaft 39, supported in a bearing 40 secured to the case of the engine 34.

The other engine 35 is provided with a shaft 41 extending from both ends and the forward end is provided with a fixed bevel gear 42 engaging a mating gear 43 fixed to the shaft 44 which passes vertically upward through the bracket 45', bolted to the engine frame 32.

By reference to Figure 8 it will be seen that the shafts 39 and 44 are disposed upwardly and pass through friction reducing bearings provided in the walls of the gear case 30. Helical gears 45 and 46 are secured to the shafts interiorly of the casing.

A propeller shaft 47, disposed at right angles to the shafts 39 and 44, passes horizontally through the gear box 30, interiorly of which are a pair of collars 48, secured to the shaft 47. Adjacent these collars are helical gears 49 and 50 having integral hubs 51 and 52 extending through bearings formed in the ends of the gear case.

These gear elements are free to rotate about the shaft 47 and are provided with positive drive means 53, connecting the hub ends of the inside members 54 and 55 of the friction clutch drive.

These clutch members are free to rotate on the shaft 47 and are prevented from side movement by the collars 56 fixed to the shaft.

The outer members of the clutch 57 and 58 are slidably engaged with the shaft 47 by the keys 59 fixed therein and grooves 60 are provided in the hubs of the clutches receptive of the forked ends of the operating bar 61.

Cone shaped helical springs 62 provide means for normally holding the clutch elements 54—57 and 55—56 in frictional engagement and collars 63, fixed to the shaft 47, hold the springs in compression at all times.

As shown by the drawings, the shaft 47 extends to the left, passing through the front end of the fuselage, and is provided with usual means for securing the main propeller 64 thereon, while the opposite end of the shaft extends a short distance to the right and is provided with a crank 65 for starting the engines.

As shown in Figure 8, the shafts 39 and 44 extend above the gear box 50 and spur gears 70 and 71 to which are secured by bolts 72 the inner friction clutch members 73 and 74 are free to rotate and are held adjacent the thrust bearing 75 by collars 76 fixed to the shafts.

Outer friction clutch members 77 and 78 are slidably engaged with the shafts 39 and 44 by the keys 79 fixed therewith and grooves 80 are provided in the hubs of the clutch members 77 and 78 receptive of the bell-crank forked levers 81 and 82 shown in Figure 6.

Normal engagement between the clutch members is effected by the compressive force of the conical springs 83 held in tension by the collars 84, fixed to the shafts 39 and 44.

Fixed to the shaft 28 and in mesh with the friction clutch gears 70 and 71, is the spur gear 85 conveying motion from the clutch gears to the bevel gears 25 and 26 and through them to the supplementary propeller 29, as shown in Figures 2 and 3.

In Figure 6, a partition 90 is shown dividing the engine compartment from the cock-pit, and through this partition the engine shaft 41 extends, on which is slidably mounted the outer friction clutch member 91. A key 92 fixed in the shaft, compels rotation of the clutch and a foot operated pedal 93 is provided with a downturned fork element 94 engaging a groove 95 formed on the hub of the clutch 91. A spring 92 causes the clutch and foot pedal to be drawn into normal engaging position with the inner clutch member 96, secured to the end of a concentrically positioned shaft 97, extending into the change gear box generally designated as 98.

This change gear box, best shown in Figure 10, is rigidly secured to the floor of the cock-pit in a manner compelling alinement of the shafts 41 and 47.

The interior of the mechanism is of usual construction and consists essentially of the sliding gears 99 engageable with the gears 100 and 101 secured to the shaft 102, extending through the casing and carrying a balance wheel 103 and terminating at its end with a universal joint 104 secured thereon.

A lever 105 is pivoted in the casing and extending into a box to engage a groove formed between the toothed elements of the gear 99. Changes in speeds are accomplished by moving this lever forward or backward as required.

Another lever 106 is also pivoted to the casing and is adapted to change the direction of rotation of the shaft 102, toothed clutch elements 107 and 108 engaged with the shaft 97 and the intermediate gear 109, in mesh with the gear 110, fixed to the shaft 102, when the lever is moved back or forward as required.

Another lever 112, shown in Figure 6, pivoted at its lower end to the side of the casing 98 and a link 114 is attached above the pivotal points and extends forward connecting one element of a bell-crank 115, centrally pivoted to the engine frame 33. The other element of the bell-crank is connected to a vertically disposed link bar 116, the upper end being pivoted to another bell-crank 117 having its vertical element pivoted to the clutch operating bar 61, slidably secured and held in the bearings 118.

From the foregoing description it will be seen that by manipulating the lever 112, the main propeller 64 may be engaged and disengaged from rotation at will without stopping the engines, while the supplementary propeller 29 may be similarly engaged and disengaged from rotation by means of a lever (not shown) connected with the clutch operating bars 119 and 120. It will also be seen that the propellers may be independently operated or rendered inoperative without stopping the engines.

Referring to Figure 6, the universal joint element 104 is engaged with a mating element 122, shown in Figure 4, and is secured to a shaft 123, provided with a gear in mesh with other gears forming a differential gear system enclosed in the housing 124 and adapted to convey power to the drive wheels 12.

It will be seen that motive power is initially derived and taken from the engine 35 by means of the friction clutch elements 91 and 96, operatively engaged by the foot pedal 93 and means with the levers 105 and 106 for changing the speeds and reversing the direction of travel when the structure is moved along the ground previous to taking flight or after landing.

Means for steering the mobile portion of the structure are seen in Figure 4 and comprise essentially a steering wheel 150, below which is a gear 151 engaging a rack 152, having attached at its forward end the usual connective means, generally designated by the numeral 154, for causing the knuckle joints 155 to turn.

Secured to the rearward end of the rack 152, and also at a point midway of its length, are cables 20 and 21 employed in controlling the rudders 18 and 19. The cable 21 passes over a pulley 156, thus clearing the steering post.

Another steering wheel 157 has a stem engaging a gear 158, in mesh with the transverse rack 159, to each end of which is attached a cable 160 and after passing over guide pulleys 161, is carried upward and attached to the planes for the purpose of banking the aeroplane.

As changes in construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. In an aeroplane, the combination with motor driven wheels, of a frame for maintaining the wheels, a fuselage mounted on said frame, sustaining planes engaged with the fuselage, primary and secondary propellers, and means for disengaging one of said propellers without disengaging the other, and other means whereby both propellers may be disengaged without stopping the engines.

2. In an aeroplane comprising a wheel supported mobile fuselage having sustaining planes fixed therewith, a pair of propellers fixed on shafts extending from the structure and means for rotating said shafts and propellers consisting of a pair of engines secured in the fuselage, a transmission gear box above the engines, a pair of vertical shafts geared to said engines and extending through said gear box, a primary propeller shaft extending horizontally through said gear box, helical gears free on said shaft and engaged with other helical gears fixed on the vertical shafts, a friction clutch engaged on said horizontal shaft for communicating rotary motion to said propeller.

3. In an aeroplane for sustained flight, comprising planes and fuselage, engines in the fuselage, vertical shafts connected with said engines, geared friction wheels on said shafts, an intermediate gear in mesh with said friction gears, a vertical auxiliary shaft fixed with the intermediate gear, said vertical shaft having bevel gear connections adapted to rotate a secondary propeller and clutches slidable on the first mentioned vertical shafts adapted to transmit rotary motion from either of said shafts to said secondary propeller.

4. In an aeroplane having means for sustained flight, comprising planes and motive means associated therewith, a fuselage, a frame attached to said fuselage, wheels engaged with the frame, said wheels being adapted to propel the structure along the ground, dirigible means for controlling said structure consisting of a pair of steering wheels disposed one above the other, spur gears secured to stems depending from said wheels, toothed racks in mesh with said gears, means with one of said racks for deflecting the forward pair of traction wheels, and cables connected to the same rack for simultaneously manipulating rudder members, and means with the other one of said racks for banking the aeroplane.

In witness whereof I affix my signature.

FRANK GILL.